United States Patent
Krahn et al.

(10) Patent No.: US 9,185,174 B2
(45) Date of Patent: Nov. 10, 2015

(54) MAINTAINING MOBILE DEVICE OPERATIONS

(75) Inventors: Jim Krahn, Eagle, ID (US); Brett Donahue, Eagle, ID (US); Marc Jourdenais, Boise, ID (US)

(73) Assignee: iAnywhere Solutions, Inc., Dublin, CA (US)

( * ) Notice: Subject to any disclaimer, the term of this patent is extended or adjusted under 35 U.S.C. 154(b) by 610 days.

(21) Appl. No.: 12/432,177

(22) Filed: Apr. 29, 2009

(65) Prior Publication Data
US 2010/0281143 A1 Nov. 4, 2010

(51) Int. Cl.
*G06F 15/177* (2006.01)
*H04L 29/08* (2006.01)
*H04L 29/06* (2006.01)

(52) U.S. Cl.
CPC ............... *H04L 67/22* (2013.01); *H04L 67/26* (2013.01); *H04L 67/42* (2013.01)

(58) Field of Classification Search
CPC ....... H04L 67/24; H04L 67/42; H04L 51/046; H04L 67/22; H04L 67/26; G06F 11/0778; G06F 19/3406; G06F 15/177
USPC ............. 709/248, 221–224; 707/201, 10, 101
See application file for complete search history.

(56) References Cited

U.S. PATENT DOCUMENTS

| | | | |
|---|---|---|---|
| 7,565,381 B2 * | 7/2009 | Oswalt | 1/1 |
| 7,613,834 B1 * | 11/2009 | Pallipuram et al. | 709/248 |
| 7,627,658 B2 * | 12/2009 | Levett et al. | 709/223 |
| 2004/0018831 A1 * | 1/2004 | Majmundar et al. | 455/419 |
| 2004/0093281 A1 * | 5/2004 | Silverstein et al. | 705/26 |
| 2004/0249919 A1 * | 12/2004 | Mattheis | 709/223 |
| 2007/0118617 A1 * | 5/2007 | Lee et al. | 709/219 |
| 2008/0184221 A1 * | 7/2008 | Rengarajan et al. | 717/173 |
| 2009/0023435 A1 * | 1/2009 | Kuivalainen | 455/419 |
| 2009/0138870 A1 * | 5/2009 | Shahindoust et al. | 717/172 |
| 2009/0182600 A1 * | 7/2009 | Lungu | 705/7 |
| 2009/0307763 A1 * | 12/2009 | Rawlins et al. | 726/5 |
| 2010/0071035 A1 * | 3/2010 | Budko et al. | 726/4 |
| 2011/0093743 A1 * | 4/2011 | Arcese et al. | 714/18 |

* cited by examiner

*Primary Examiner* — Hitesh Patel
*Assistant Examiner* — Benjamin M Thieu
(74) *Attorney, Agent, or Firm* — Sterne, Kessler, Goldstein & Fox P.L.L.C.

(57) ABSTRACT

Systems, methods, and computer program products are provided for synchronizing device settings at a mobile device with settings held at a database in a synchronization server. This settings exchange mechanism is further extended to provide versioning information used in an auto upgrade process, in which the synchronization server is configured to push updates to the mobile device. Additional systems, methods, and computer program products are provided for configuring logging preferences on the mobile device from a server, and further for silently retrieving logs generated on the mobile device to the server.

22 Claims, 11 Drawing Sheets

MAINTAINING MOBILE DEVICE OPERATIONS

BACKGROUND OF INVENTION

1. Field of the Invention

The present invention relates generally to enterprise networks and, more specifically, to synchronization and logging on mobile devices.

2. Description of the Background Art

In an enterprise environment, administrators need the ability to properly control devices attached to the enterprise network, and to diagnose the devices, without requiring intervention from end-users of the devices. Presently, it is necessary for administrators to perform many configuration functions manually on mobile devices attached to enterprise e-mail systems. In order to have remote access to the devices, third-party applications may be used specifically for this function, which results in significant overhead. This is similarly the case with device logging mechanisms. Installing and maintaining these components requires occasional user intervention, as the processes are under the mobile device user's control.

Accordingly, what is desired is a mechanism for performing configuration and diagnostic functions using an existing enterprise framework.

SUMMARY OF INVENTION

Embodiments of the invention include a server comprising a system configuration database, a settings exchange object configured to push an administrator modification made to the system configuration database to a client device, an auto upgrade object configured to push an upgrade component to the client device, and a trace and diagnostic object configured to silently pull a log generated by a logging process on the client device.

Embodiments of the invention also include a client device comprising a device settings module, a settings exchange module configured to receive a settings change from a server, an auto upgrade module configured to receive and apply an upgrade component, and a trace and diagnostic module configured to execute a logging process, and to silently provide a log generated by the logging process upon request by the server.

Embodiments of the invention also include a method comprising defining a template comprising one or more template device settings, applying the template device settings to a system configuration for a client device at a synchronization server, and sending the template device settings to the client device, the client device configured to update a local device setting using the template device setting, to restart one or more components subsequent to the updating, and to read and use the updated local device setting in the one or more components subsequent to restarting.

Embodiments of the invention also include a system comprising a synchronization server comprising a stored device version, the synchronization server configured to push an update component to a client engine based on a comparison of the stored device version and a version of the update component, and a device comprising the client engine configured to receive the update component, to apply the update component, to update a local device version, to restart the client engine, and to send the updated local device version to the synchronization server, wherein the synchronization server is further operable to replace the stored device version with the updated local device version.

Embodiments of the invention also include a computer-readable medium having computer-executable instructions stored thereon that, if executed by a computing device, cause the computing device to perform a method comprising sending logging preferences to a client device, the client device configured to run a logging process based on the logging preferences, selecting the client device for access at a server, pulling one or more logs generated by the logging process silently from a client engine on the client device, and storing the one or more logs on the server.

Embodiments of the invention also include a method comprising receiving a settings change from a server, the settings change being made to a system configuration database at the server, applying the settings change to a local device setting, executing a logging process, and silently providing a log generated by the logging process upon request by the server.

Embodiments of the invention also include a computer-readable medium having computer-executable instructions stored thereon that, if executed by a computing device, cause the computing device to perform a method comprising receiving a settings change from a server, the settings change being made to a system configuration database at the server, applying the settings change to a local device setting, executing a logging process, and silently providing a log generated by the logging process upon request by the server.

Embodiments of the invention also include a method comprising modifying a setting in a system configuration database, pushing the modified setting to a client device for application at the client device, the client device configured to restart one or more components of the client device after the application, and pushing an upgrade component to the client device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
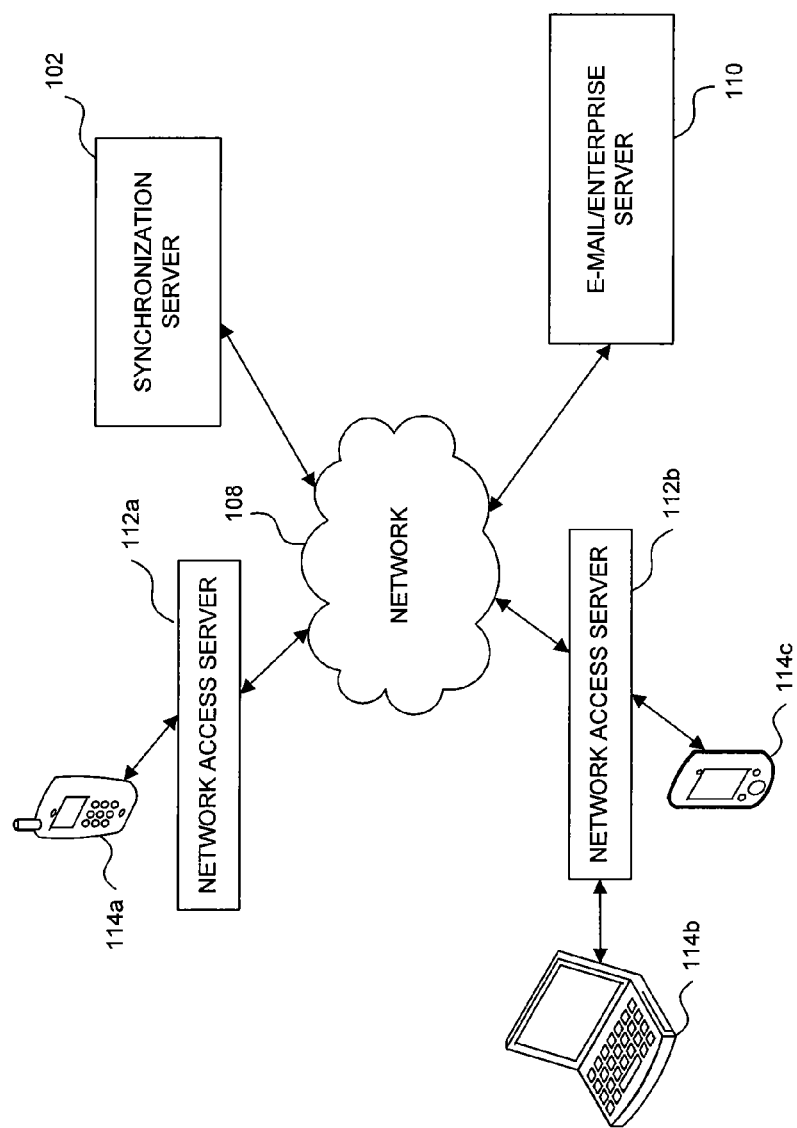
FIG. 1 depicts a mobile data environment, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 depicts a mobile environment 100 which allows mobile devices 114a-c to synchronize email with email server 110 over a network 108, in accordance with an embodiment of the present invention. While this embodiment is described in terms of email, it is applicable to other data objects. One skilled in the relevant arts will appreciate that any network, such as a corporate intranet or the Internet, comprised of wired or wireless interconnections, or several such interconnected networks, may be substituted for network 108. One skilled in the relevant arts will further appreciate that additional devices, including non-mobile devices with wired connectivity, may be substituted for mobile devices 114a-c. Mobile device 114a accesses network 108 via network access server 112a in order to send and receive email to and from email server 110. Mobile devices 114b and 114c access network 108 via network access server 112b in order to synchronize email with email server 110.

Mobile devices 114a-c may be one of many devices commonly designated as mobile clients, such as, but not limited to, personal digital assistants ("PDAs"), devices operating according to the Microsoft Pocket PC specification with the Microsoft Windows® CE operating system, Symbian, PalmOSmobile phones, BlackBerry® devices, iPhone® devices, smart phones, hand held computers, palmtop computers, laptop computers, ultra-mobile PCs, and other wireless mobile devices capable of running mobile applications.

Figure 2:
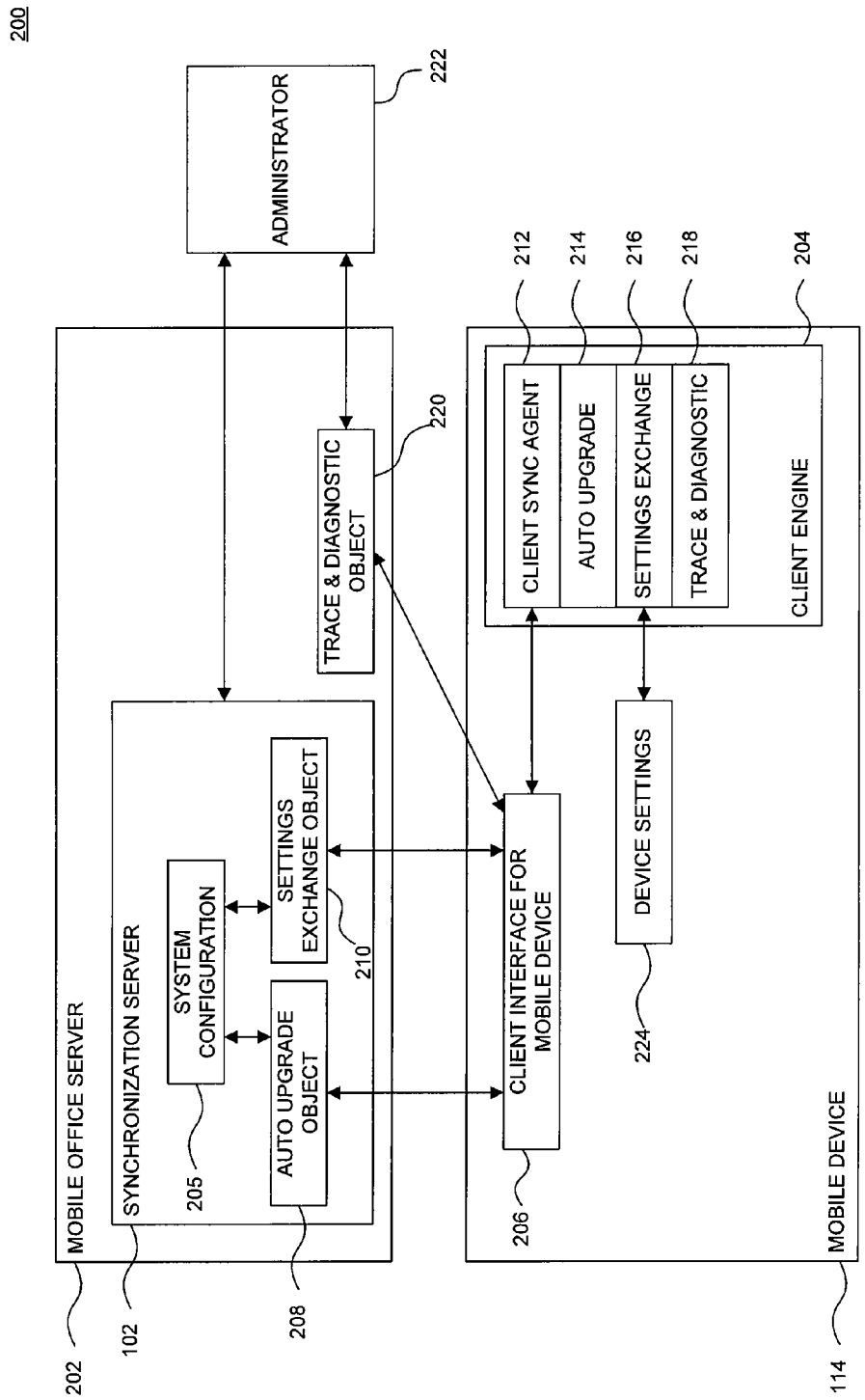
FIG. 2 illustrates interfaces between a mobile office server and a mobile device, in accordance with an embodiment of the present invention.

FIG. 2 illustrates interfaces between a mobile office server and a mobile device, in accordance with an embodiment of the present invention. The mobile office server and mobile device environment 200 of FIG. 2 includes a mobile office server 202, which comprises synchronization server 102, in accordance with an embodiment of the present invention. An auto upgrade object 208 and a settings exchange object 210 are each in communication with a system configuration database 205 (referred to herein as the "system configuration" or simply "database"), and further in communication with the mobile device 114 through the client interface 206 for the mobile device.

Separately, within the mobile office server 202, a trace and diagnostic object 220 is also in communication with the client interface 206 for mobile device 114. An administrator 222 is shown in communication with synchronization server 102 and trace and diagnostic object 220, in accordance with an embodiment of the present invention.

One skilled in the relevant arts will appreciate that the auto upgrade object 208, settings exchange object 210, and the trace and diagnostic object 220 can each be present either alone or in combination with other objects in an embodiment of the present invention. Moreover, one skilled in the relevant arts will appreciate that the particular placement of the auto upgrade object 208, settings exchange object 210, and the trace and diagnostic object 220 within the mobile office server 202 framework can vary, and the particular layout of environment 200 is presented by way of example, and not limitation.

Administrator 222 is a system in communication with the synchronization server 102 and the trace and diagnostic object 220, in accordance with an embodiment of the present invention. One skilled in the relevant arts will appreciate that the administrator 222 can be in communication with any module present in mobile office server 202, and the interfaces shown in environment 200 are presented by way of example, and not limitation. Furthermore, one skilled in the relevant arts will appreciate that administrator 222 may be a human user interacting directly with mobile office server 202 and its components, and need not be a separate system.

The client interface 206 for mobile device 114 is operable to communicate messages to and from components of synchronization server 102, such as settings exchange object 210 and auto upgrade object 208, and trace diagnostic object 220 on mobile office server 202, as well as client sync agent 212 in client engine 204, in accordance with an embodiment of the present invention. Client sync agent is in communication with auto upgrade module 214, settings exchange module 216, and trace and diagnostic module 218 of client engine 204, in accordance with a further embodiment of the present invention. Settings exchange module 216 is able to read and set device settings 224, which are utilized by one or more components running on mobile device 114, in accordance with an embodiment of the present invention.

Although each of the aforementioned systems are illustrated as part of environment 200, the settings exchange mechanisms of settings exchange object 210 and settings exchange module 216 can be implemented without also implementing the auto upgrade mechanisms of auto upgrade object 208 and auto upgrade module 214, or the trace and diagnostic mechanisms of trace and diagnostic object 220 and trace and diagnostic module 218. Accordingly, the various mechanisms are discussed separately below.

II. Settings Exchange

A. Settings Modified at the Synchronization Server

Figure 3:
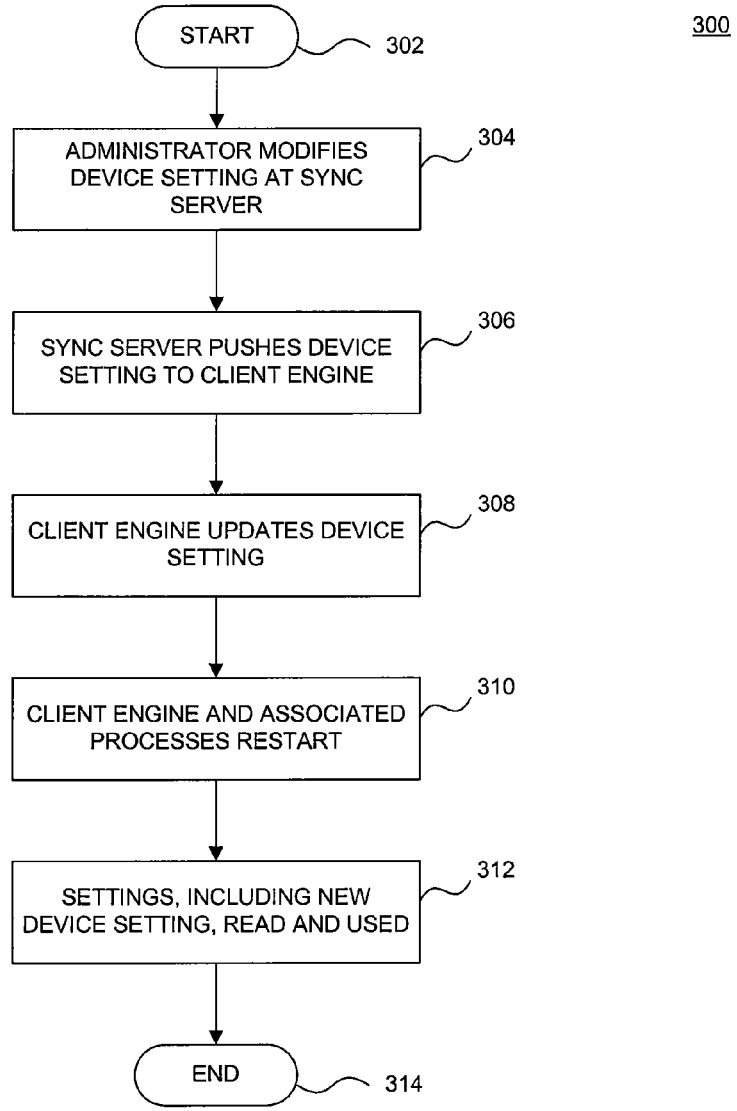
FIG. 3 is a flowchart illustrating steps by which an administrator can modify a device setting using a synchronization server, in accordance with an embodiment of the present invention.

FIG. 3 is a flowchart 300 illustrating steps by which an administrator, such as administrator 222, can modify a device setting using synchronization server 102, in accordance with an embodiment of the present invention. One skilled in the relevant arts will appreciate that modification of device settings by an administrator can be performed by a user granted administrator privileges, or by a process, device, or other component operating under administrator privileges. Other means by which a user, process, or device may be granted rights to modify device settings will also be readily apparent to one skilled in the relevant arts, and modification by way of an administrator 222 is presented by way of example, and not limitation.

The method begins at step 302 and proceeds to step 304, where an administrator 222 modifies a device setting at synchronization server 102. By way of example, and not limitation, an administrator 222 is able to modify the settings for a particular device or user by adjusting the value of a setting as it is stored at system configuration database 205. One skilled in the relevant arts will appreciate that a number of implementations exist for achieving this, including the use of a configuration object for the purpose of updating system configuration database 205, direct modification, and modification through the settings exchange object 210, among others.

At step 306, the synchronization server 102, by way of the settings exchange object 210, pushes the device setting to the client engine 204, by way of client interface 206, in accordance with an embodiment of the present invention. The synchronization server obtains the current setting from system configuration database 205, which it uses to send to device 114. In accordance with an embodiment of the present invention, the settings exchange protocol is optimized to only send one or more settings which have been changed.

The client engine 204 receives the device setting, at the client sync agent 212, which passes the device setting to the settings exchange module 216 for updating the device setting at step 308. One skilled in the relevant arts will recognize that the precise architecture of mobile device 114 may be different, and the instant architecture is presented by way of example, and not limitation. Settings exchange module 216 applies the device setting received from synchronization server 102 to device settings 224. Although device settings 224 is shown as a single module within mobile device 114, device settings 224 may comprise a plurality of device settings located throughout various components of mobile device 114. By way of example, and not limitation, device settings 224 comprise settings which affect display options for a mail client located on mobile device 114. One skilled in the relevant arts will appreciate that other settings affecting other components, including, by way of example and not limitation, an operating system running on mobile device 114 or even firmware or hardware of mobile device 114, may be modified by the techniques of flowchart 300.

At step 310, the client engine 204 and associated processes restart, in accordance with an embodiment of the present invention. The term "processes" as used herein may refer to any component of mobile device 114, including those operable to read and utilize device settings 224 for their configuration. One skilled in the relevant arts will recognize that such processes may include, by way of example and not limitation, an operating system running on mobile device 114, various components running under the operating system, firmware running directly on mobile device 114, including mobile device 114 itself, and other components. By restarting processes which rely on device settings 224, the processes are efficiently updated to use the new device settings as stored in device settings 224. Such processes are designed such that they implement clean shutdown mechanisms, ensuring that a restart is handled in a relatively safe manner.

One skilled in the relevant arts will appreciate that other mechanisms for updating processes may be used, such as, by way of example and not limitation, notifying running processes of an update to device settings 224. By notifying the running processes of an update, the processes can retrieve the updated device settings from device settings 224 without the need to restart. However, in an embodiment where processes have a clean shutdown mechanism, restarting the client engine 204 and the associated processes is the preferred embodiment, as it better ensures proper handling of the updated device settings by the processes. By restarting the processes, assuming such restarting can be handled safely, the process will be reinitialized with the current device settings 224, and it is not necessary to rely on proper implementation of update routines by the process developers for satisfactory updating. However, either mechanism, as well as other update mechanisms, as will be recognized by one skilled in the relevant arts, may be employed.

In accordance with an additional embodiment of the present invention, a process to be restarted at step 310 is only restarted if the changes to device settings 224 would affect the process. One skilled in the relevant arts will appreciate that a number of mechanisms exist for identifying which processes, including the client engine 204, should be restarted, including, by way of example and not limitation, associating one or more settings from device settings 224 with a process, and only restarting the process if the one or more settings have been updated. Additionally, an update to device settings 224 which keeps the same setting value or has no effect on the process will result in the process not being restarted, in accordance with a further embodiment of the present invention.

At step 312, the client engine 204 and any running processes read and use the updated device settings 224 after the restart. The method ends at step 314.

B. Settings Modified at the Mobile Device

Figure 4:
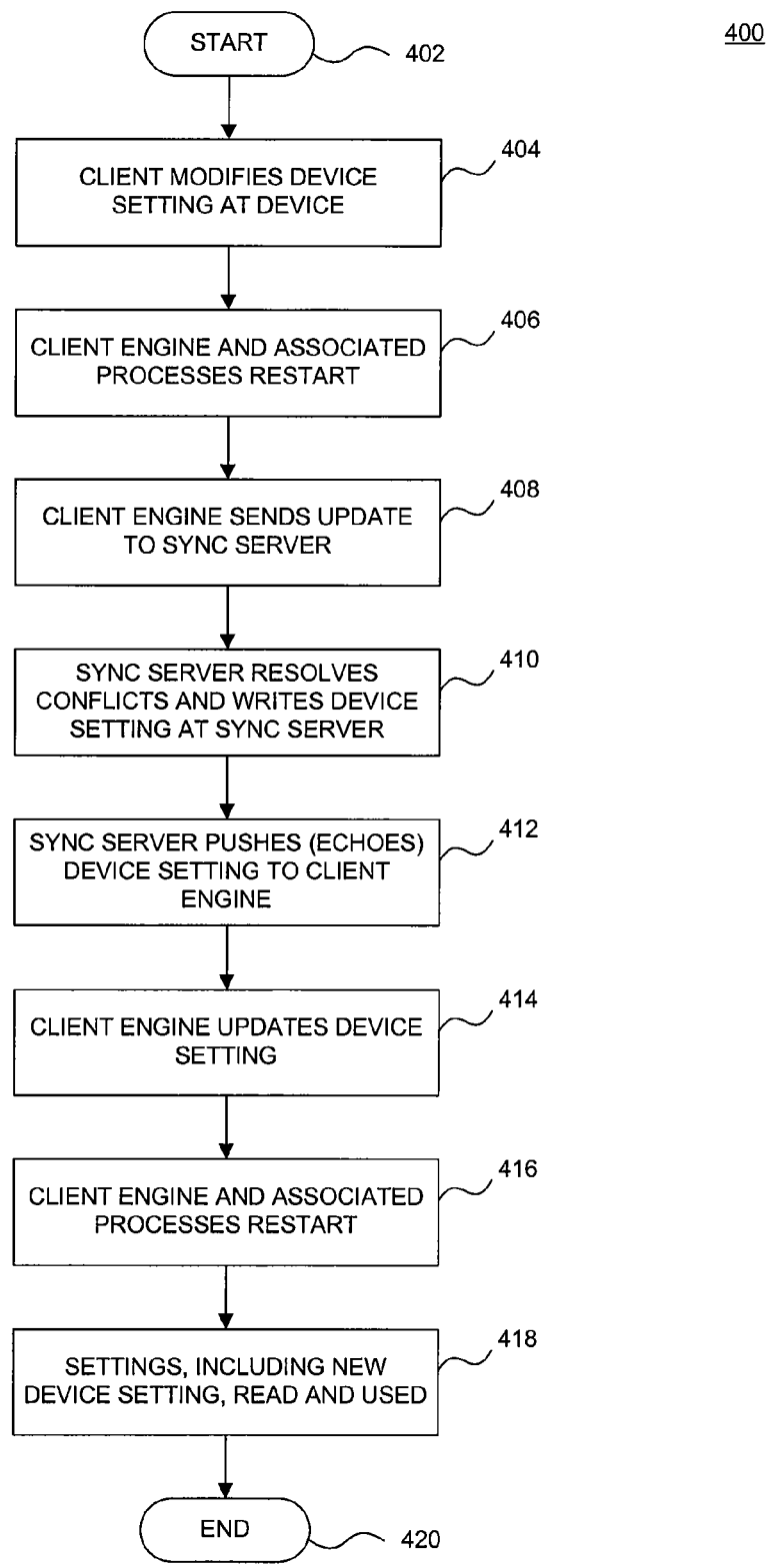
FIG. 4 is a flowchart illustrating steps by which settings exchange through the synchronization server handles settings changes originating from the device, in accordance with an embodiment of the present invention.

FIG. 4 is a flowchart 400 illustrating steps by which settings exchange through the synchronization server 102 handles settings changes originating from the mobile device 114, in accordance with an embodiment of the present invention. The method begins at step 402 and proceeds to step 404 where a client modifies a device setting at the device. One skilled in the relevant arts will appreciate that the client making the modification could be a user or a system component, including hardware and software components, capable of modifying device settings 224. Reference to a client is, therefore, by way of example, and not limitation.

As above with step 310 of FIG. 3, the client engine and associated processes restart at step 406, in accordance with an embodiment of the present invention. In accordance with a further embodiment of the present invention, as noted above, the client engine and associated processes restart only when device settings 224 are modified which require their restart. One skilled in the relevant arts will appreciate, as before, that other mechanisms for updating processes may be used, such as, by way of example and not limitation, notifying running processes of an update to device settings 224.

At step 408, the client engine 204 sends an update to synchronization server 102, in accordance with an embodiment of the present invention. In accordance with a further embodiment of the present invention, settings exchange module 216 detects changes made to device settings 224 and sends the updated settings to synchronization server 102 through client sync agent 212, which in turn communicates with settings exchange object 210 on synchronization server 102 via client interface module 206. The settings exchange module 216 is configured to send updates only for those device settings that have new values, in accordance with an additional embodiment of the present invention.

The processing at step 410 involves resolving any conflicts between the received device settings and settings changes made by an administrator 222. By way of example, and not limitation, a conflict may arise in the situation where an administrator modifies a device setting at synchronization server 102 per step 304 of FIG. 3, and a client modifies the same device setting at the mobile device 114 per step 404 of FIG. 4, during a same timeframe. This could occur, for example, if the administrator 222 modifies the device settings within system configuration 205 at the synchronization server 102 simultaneously with the client's modification of the device settings 224 at mobile device 114.

A conflict could also occur, for example, in the event that communications between client interface 206 and synchronization server 102, or components thereof, have been interrupted. Communications between client interface 206 and synchronization server 102, or components thereof, may include, by way of example and not limitation, the MOCA framework disclosed in U.S. patent application Ser. No. 12/104,905 to Jeide et al., filed Apr. 17, 2008, which is incorporated herein by reference in its entirety. One skilled in the relevant arts will recognize that other communications means may be utilized, and similar approaches for conflict resolution may be employed. If communications between client interface 206 and synchronization server 102, or components thereof, have been interrupted, an update to device settings 224 would not be reflected within system configuration database 205 of synchronization server 102. Neither would an update by administrator 222 to any device settings held in system configuration database 205 of synchronization server 102 be reflected on mobile device 114. When communications between client interface 206 and synchronization server 102 are reestablished, a mechanism for resolving any conflicts in queued communications is employed, in accordance with an embodiment of the present invention.

In accordance with an embodiment of the present invention, conflicts are resolved based on a timestamp on any settings exchange communications between client interface 206 and settings exchange object 210. In a preferred embodiment utilizing timestamps for conflict resolution, mobile device 114 is synchronized to the system time of synchronization server 102, such that the timestamps have a common reference point. One skilled in the relevant arts will recognize that other conflict resolution means may be employed, and the use of timestamps is presented by way of example, and not limitation.

At step 412, synchronization server 102, by way of the settings exchange object 210, retrieves the current device settings from system configuration database 205 and pushes them to client engine 204, in accordance with an embodiment of the present invention. In the situation where the original client modification from step 404 has not been subject to a conflict with an administrator 222 modification at step 410, this results in the echoing back of the client's own setting to the client engine 204. Client engine 204, particularly the settings exchange module 216, then updates the device settings 224 using the received setting at step 414, in accordance with an embodiment of the present invention.

At step 416, the client engine 204 and associated processes restart, in similar manner as with step 406, in accordance with an embodiment of the present invention. However, as the restarting occurs only when a relevant device setting 224 change has been made, in accordance with a further embodiment of the present invention, it is unlikely that the client engine 204 and associated processes will restart at step 416. If the client modifications to the device settings 224 at step 404 are not in conflict with any administrator 222 settings at step 410, then the same settings are echoed back to client engine 204. Using these settings to update device settings 224 will not result in a change to device settings 224, and therefore there will be no need to restart the client engine 204 and associated processes at step 416. However, if there has been a conflict with an administrator 222 setting at step 410, then the device setting updated at step 414 by the client engine 204 could potentially be different from what was previously stored at device settings 224. In this case, restarting the client engine 204 and associated processes at step 416 will enable the client engine 204 and associated processes to utilize the current device settings 224 as modified by the administrator 222.

At step 418, the client engine 204 and any running processes read and use the updated device settings 224 after the restart. The method ends at step 420.

C. Exemplary User Interfaces

Figure 5A:
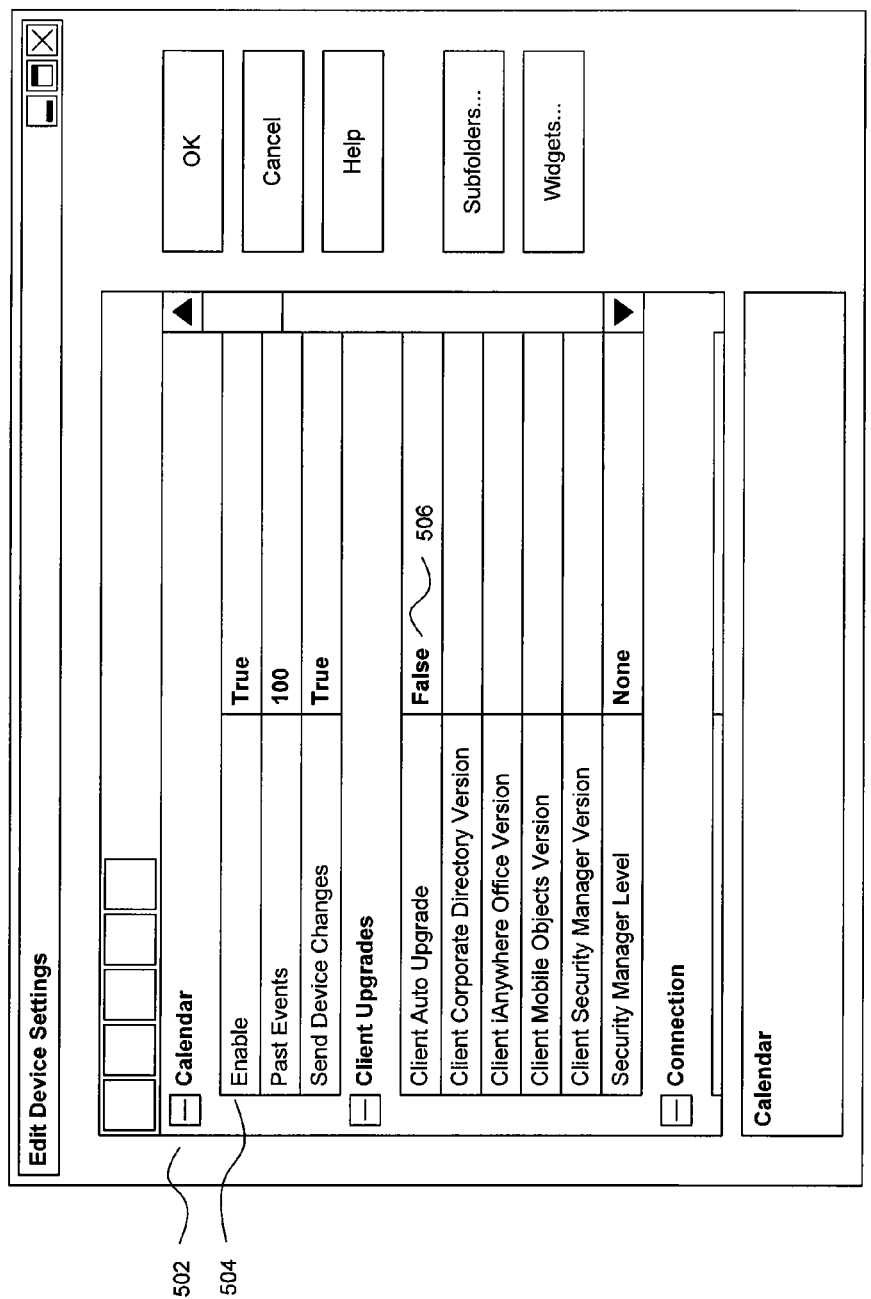
FIG. 5A illustrates a user-interface by which an administrator is able to modify device settings at a synchronization server, in accordance with an embodiment of the present invention.

FIG. 5A illustrates a user-interface 500 by which an administrator, such as administrator 222, is able to modify device settings at synchronization server 102, in accordance with an embodiment of the present invention. For example, an administrator 222 may utilize the user-interface 500 to perform modification step 304 of FIG. 3.

User-interface 500 includes various categories 502 of settings such as, by way of example and not limitation, settings related to a calendar, client upgrades, and connections. Within each of the categories 502 are individual settings 504 and their current values 506. An administrator modifying a device setting per step 304 of FIG. 3 selects an individual setting 504 and adjusts the current value 506 associated with the individual setting 504. After confirming the change (such as, for example, by hitting the "OK" button), the remaining steps of flowchart 300 of FIG. 3 are carried out within mobile device environment 200, in accordance with an embodiment of the present invention.

Figure 5B:
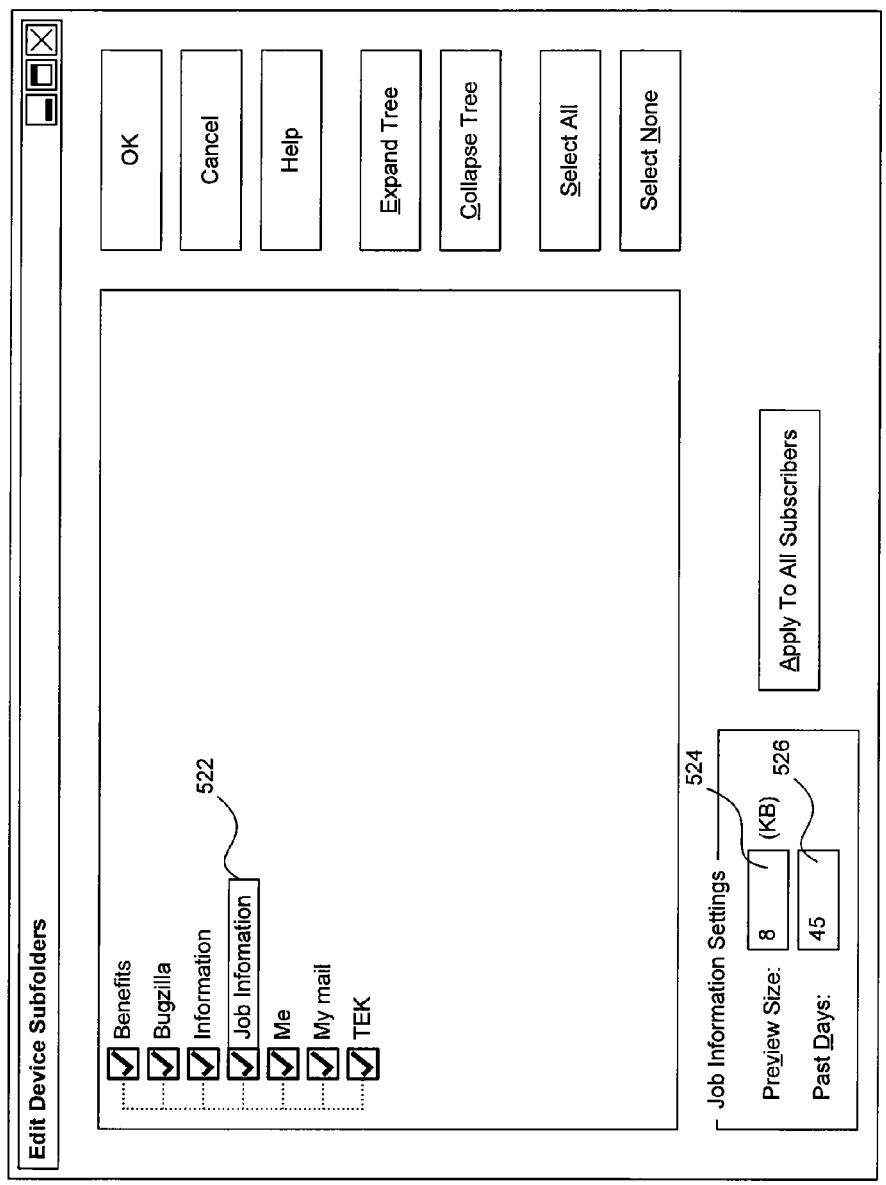
FIG. 5B illustrates a user-interface by which an administrator is able to modify device settings at a synchronization server which pertain to the display of e-mail, in accordance with an embodiment of the present invention.

FIG. 5B illustrates a user-interface 520 by which administrator 222 is able to modify device settings at synchronization server 102 which pertain to the display of e-mail, such as from an e-mail or enterprise server 110 of FIG. 1, in accordance with an embodiment of the present invention. The administrator 222 is able to select individual subfolders 522 from e-mail or enterprise server 110 that will be synchronized to mobile device 114. Additionally, administrator 222 can specify a preview size 524 for individual e-mail messages, as well as the number of past days 526 for which e-mails will be displayed on mobile device 114. One skilled in the relevant arts will appreciate that additional e-mail specific settings useful in an enterprise environment, such as that depicted in FIG. 1, can be useful and included in a user-interface such as user-interface 520. Accordingly, the particulars of user-interface 520 are presented by way of example, and not limitation.

Figure 5C:
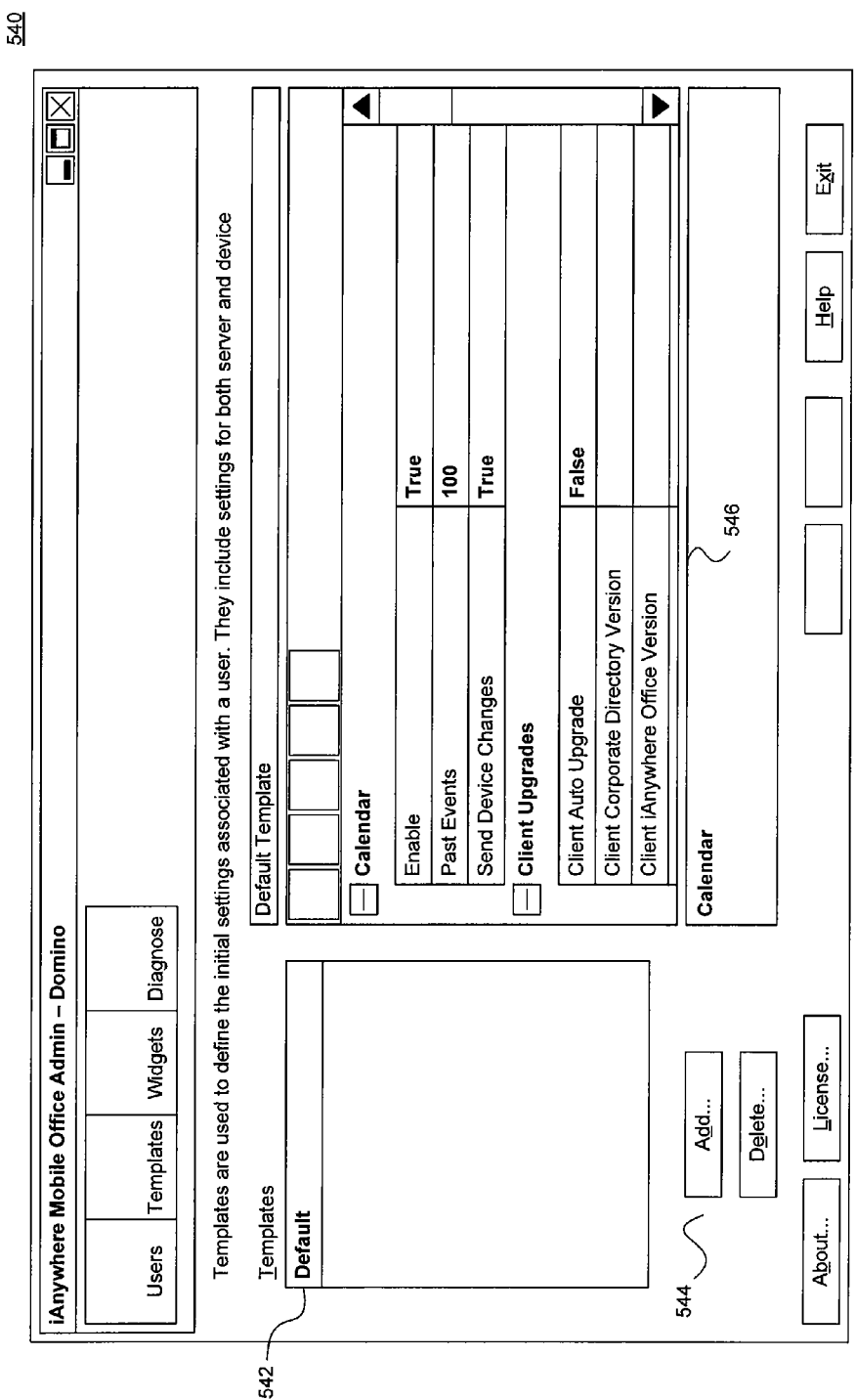
FIG. 5C illustrates a user-interface by which an administrator can associate a group of settings and their values with a template, in accordance with an embodiment of the present invention.

Although an administrator 222 is able to modify device settings for individual mobile devices 114 using the interfaces of FIGS. 5A and 5B, it is useful to have a mechanism by which users and their mobile devices 114 which have been newly synchronized with synchronization server 102 have an entire set of device settings 224 applied to their mobile device 114, rather than modifying the individual settings for each new device. FIG. 5C illustrates a user-interface 540 by which an administrator 222 can associate a group of settings and their values 546 with a template 542, in accordance with an embodiment of the present invention. Administrator 222 can add 544 a new template which, by way of example and not limitation, may be associated with a particular role. Administrator 222 may also define default settings 546 associated with a default template 542, in accordance with an embodiment of the present invention. This user-interface 540 enables an administrator 222 to quickly apply settings 546 to any user or mobile device 114.

In accordance with an embodiment of the present invention, the templates defined in template group 542 are not permanently associated with a user, such that future modifications to a particular template group 542 would not affect users that were previously created using that template. In an additional embodiment of the present invention, a user or mobile device 114 may be associated with one or more templates 542, and future updates to the templates 542 would result in the updating of the mobile device 114 device settings 224 such as by the mechanism shown in flowchart 300 of FIG. 3. One skilled in the relevant arts will recognize that additional degrees of association and means of implementing the associations between templates and users or mobile devices 114 exist, and the functionality of user-interface 540 is presented by way of example, and not limitation.

III. Auto Upgrade

Figure 6:
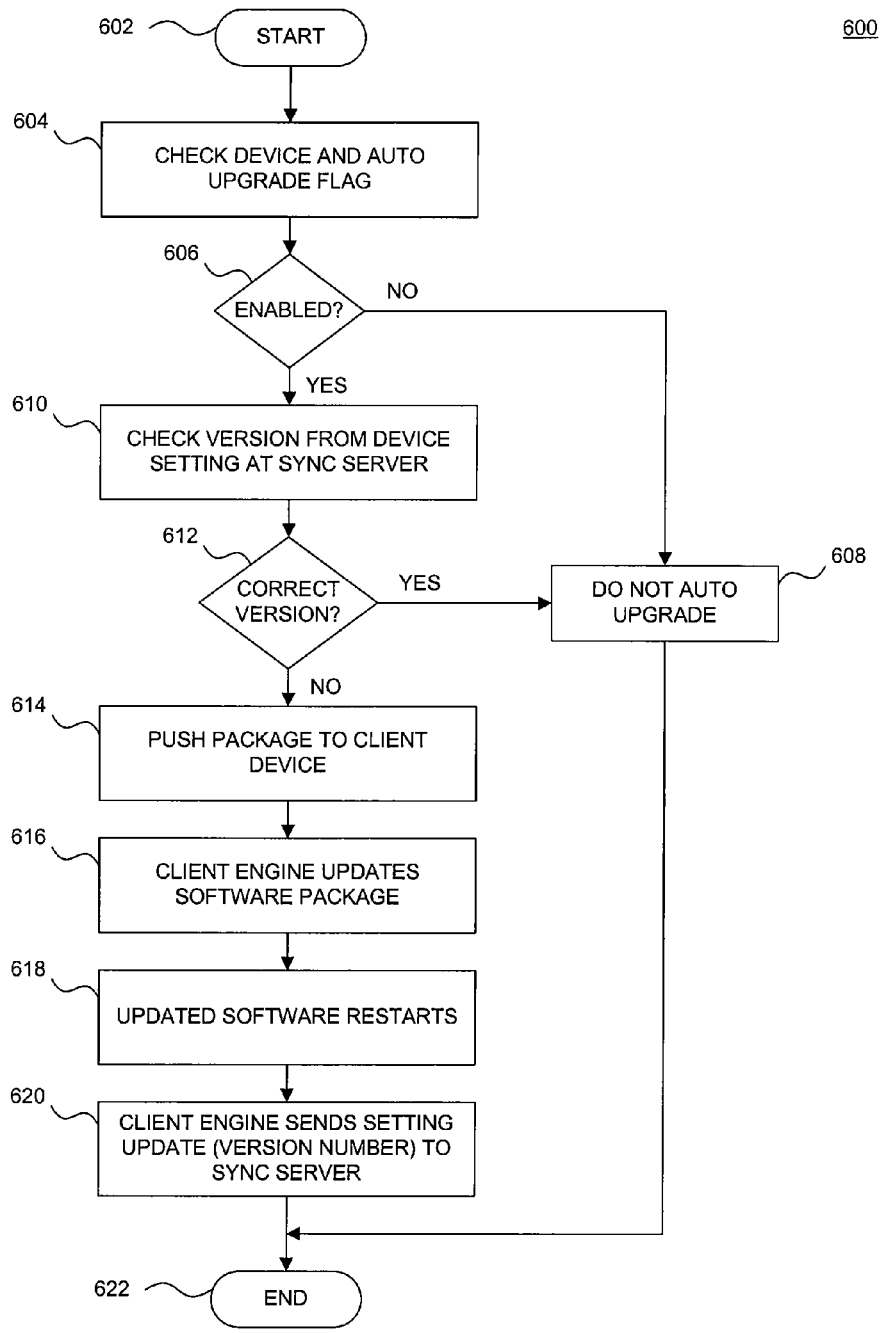
FIG. 6 is a flowchart illustrating steps by which a synchronization server can push a component upgrade to a mobile device, in accordance with an embodiment of the present invention.

FIG. 6 is a flowchart 600 illustrating steps by which synchronization server 102 can push a component upgrade to mobile device 114, in accordance with an embodiment of the present invention. Through the use of the methodology of flowchart 600, a user of mobile device 114 need not be aware that the auto upgrade process is taking place. Therefore, in accordance with an embodiment of the present invention, the auto upgrade process using the methodology of flowchart 600 is completely silent (or "transparent", requiring no user interaction) to a user of mobile device 114. One skilled in the relevant arts will recognize that a component upgraded by the methodology of flowchart 600 may include any software component, firmware component, data files, or other data on mobile device 114 that is maintained through synchronization server 102 by way of auto upgrade object 208.

The method begins at step 602 and proceeds to step 604 where a flag is checked to determine whether auto upgrades are permitted on a particular mobile device 114. Step 606 tests whether the flag is enabled and, if not, proceeds to step 608 where the auto upgrade process is cancelled, and ends at step 622. It is noted that, in accordance with an embodiment of the present invention, even if the flag is not enabled as tested at step 606, an administrator 222 has the ability to override the flag and force the auto upgrade process to continue at later steps, such as step 610 or 614.

The flag tested in steps 604 and 606 is located, in accordance with an embodiment of the present invention, in the device settings for mobile device 114 as stored in system configuration database 205 of synchronization server 102. This allows the flag to be updated by the administrator 222 or a user of mobile device 114 per the methods outlined in flowcharts 300 of FIGS. 3 and 400 of FIG. 4.

At step 610, a version number for the component being upgraded, corresponding to the version currently on mobile device 114, is checked. If the version is the correct version, as determined at step 612, then the auto upgrade process is cancelled at step 608, and ends at step 622. As previously noted, an administrator 222 has the ability to override the version test and force the auto upgrade process to continue at later steps, such as step 614, in accordance with an embodiment of the present invention. It is further noted that the determination of the correct version at step 612 may involve a variety of comparisons, and one skilled in the relevant arts will recognize that, by way of example and not limitation, a component on mobile device 114 may have the correct version per step 612 if it is of the same or greater version as the upgraded component. By way of further example, the correct version per step 612 may require that the component on mobile device 114 has the exact same version as the upgraded component, and may require downgrading. The precise methodology by which the correct version determination of step 612 is made will be evident to one skilled in the relevant art based on particular needs for an auto upgrade application.

The version information tested at steps 610 and 612 is located, in accordance with an embodiment of the present invention, in the device settings for mobile device 114 as stored in system configuration database 205 of synchronization server 102. This allows the version information to be updated by the administrator 222 or the synchronization server 102 itself in the performance of the methodology of flowchart 600, or by a user of mobile device 114 or components thereof in the event of an upgrade performed locally at mobile device 114. The updates can therefore be performed per the methods outlined in flowcharts 300 of FIGS. 3 and 400 of FIG. 4.

The component (or "package") is then pushed to mobile device 114 at step 614, in accordance with an embodiment of the present invention. The nature of the component being delivered may differ, in accordance with an embodiment of the present invention, with the software platform utilized on mobile device 114. By way of example, and not limitation, a mobile device 114 running the Windows Mobile platform would require that components be pushed in a .cab file format, whereas a Symbian platform would require that components be pushed in a .sis file format. One skilled in the relevant arts will appreciate that additional component formats may be used on any platform, including the aforementioned platforms, and the particular component formats disclosed above are presented by way of example, and not limitation.

At step 616, client engine 204 updates the software package on mobile device 114 using the component received from synchronization server 102, in accordance with an embodiment of the present invention. This is handled by auto upgrade module 214 in client engine 204. In accordance with a further embodiment of the present invention, auto upgrade module 214 performs an additional version check, similar to the one performed at step 610 by auto upgrade object 208 of synchronization server 102, prior to updating the local software package. However, in a preferred embodiment, this additional check is not performed at auto upgrade module 214 in order to avoid any need for interaction by a user at mobile device 114, in keeping with the completely silent auto upgrade methodology.

At step 618, the updated software or other affected components restart, in accordance with an embodiment of the present invention. This enables the utilization of the upgraded package by any affected components.

Furthermore, at step 620, the version number of a successfully upgraded component is changed at device settings 224, in accordance with an embodiment of the present invention. This change causes the version number to be synchronized with database 205 of synchronization server 102 using the methodology outlined in flowchart 400 of FIG. 4, in accordance with a further embodiment of the present invention. The method then ends at step 622.

IV. Trace and Diagnostic

Figure 7:
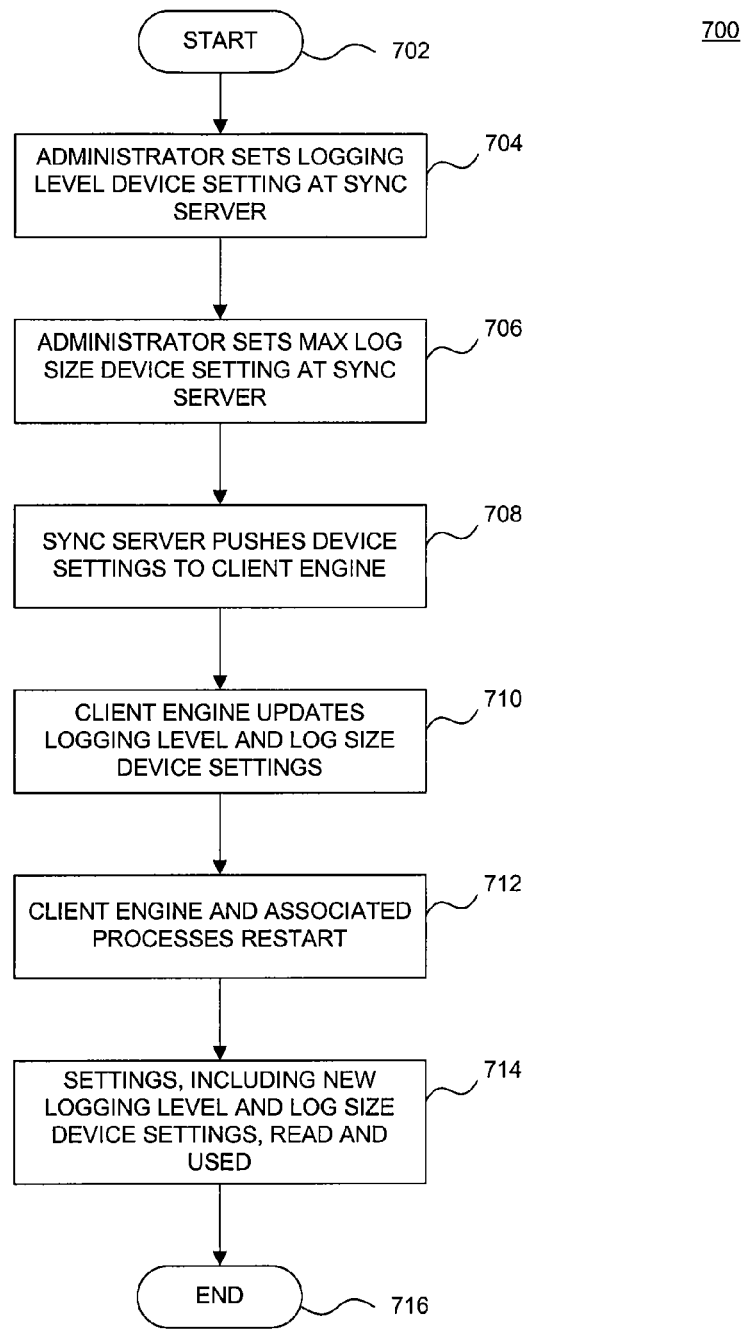
FIG. 7 is a flowchart illustrating steps by which an administrator can set trace and diagnostic behavior of a mobile device, in accordance with an embodiment of the present invention.

FIG. 7 is a flowchart 700 illustrating steps by which an administrator 222 or other user or component of mobile office server 202 can set trace and diagnostic behavior of mobile device 114, in accordance with an embodiment of the present invention. Through the use of the methodology of flowchart 700, no interaction by a user at mobile device 114 is necessary to configure trace and diagnostic logging, and the logging can be performed silently without informing the user.

The method starts at step 702 and proceeds to step 704 where administrator 222 sets a logging level device setting at synchronization server 102, in accordance with an embodiment of the present invention. At step 706, the administrator 222 also sets a maximum log size device setting at synchronization server 102, in accordance with an additional embodiment of the present invention. The settings of steps 704 and 706 are handled, in accordance with a further embodiment of the present invention, through the use of settings exchange object 210, as disclosed in detail in Section II.

Step 708 pushes the aforementioned device settings to client engine 204 in a manner corresponding to step 306 of FIG. 3. At step 710, client engine 204 updates the logging level and log size device settings, as appropriate, in a manner corresponding to step 308 of FIG. 3. At step 712, the client engine 204 and associated processes are restarted in a manner corresponding to step 310 of FIG. 3. At step 714, device settings 224, including the new logging level and log size device settings, are read and used by the client engine 204 and associated processes in a manner corresponding to step 312 of FIG. 3. Each of the aforementioned steps is disclosed in further detail with reference to the corresponding steps of FIG. 3 in Section II. The method then ends at step 716.

In an additional embodiment, trace and diagnostic object 220 operates to broker parameters such as the logging level and log size directly with mobile device 114 without the use of synchronization server 102. In this embodiment, trace and diagnostic object 220 supports communications with client interface 206, either directly or through the use of an intermediary module within mobile office server 202. The communications between trace and diagnostic object 220 and client interface 206 may include, by way of example and not limitation, the MOCA framework disclosed in U.S. patent application Ser. No. 12/104,905 to Jeide et al., filed Apr. 17, 2008, which is incorporated herein by reference in its entirety.

The trace and diagnostic parameters of steps 704 and 706 are presented by way of example, and not limitation. One skilled in the relevant arts will recognize that additional, fewer, or altogether different parameters for controlling logging behavior may be used. Mobile device 114, through the use of trace and diagnostic module 218, utilizes the trace and diagnostic parameters of steps 704 and 706 to adjust its logging behavior. For example, the logging level parameter of step 704 may specify a particular logging level from a set of logging levels, each logging level corresponding to a degree of verbosity in the logs retained by trace and diagnostic module 218. The maximum log size parameter of step 706 specifies, for example, a maximum log size in terms of data usage, in terms of number of lines of text, or some other size parameter.

Figure 8:
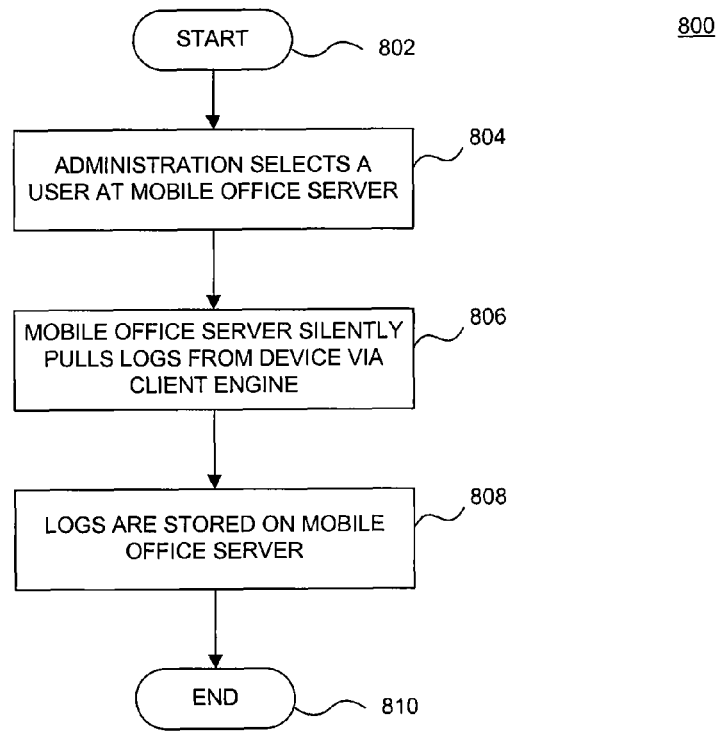
FIG. 8 is a flowchart illustrating steps by which an administrator is able to utilize the logging behavior of a mobile device to review logging information obtained by a trace and diagnostic module of the mobile device, in accordance with an embodiment of the present invention.

FIG. 8 is a flowchart 800 illustrating steps by which an administrator is able to utilize the logging behavior of mobile device 114 to review logging information obtained by trace and diagnostic module 218 of mobile device 114, in accordance with an embodiment of the present invention. The method starts at step 802 and proceeds to step 804 where the administrator 222 selects a particular user or mobile device 114 for which to retrieve the logs. In accordance with an embodiment of the present invention, this request from the administrator 222 is serviced directly by trace and diagnostic object 220. At step 806, mobile office server 202, by way of trace and diagnostic object 220, pulls logs from mobile device 114 by requesting the logs from trace and diagnostic module 218. In accordance with an additional embodiment of the present invention, communications with trace and diagnostic module 218 are handled through client sync agent 212 of client engine 204 in communication with client interface 206.

At step 808, the retrieved logs are stored on mobile office server 202 for later review by administrator 222, or analysis by components of mobile office server 202. The method ends at step 810.

V. Example Computer System Implementation

Figure 9:
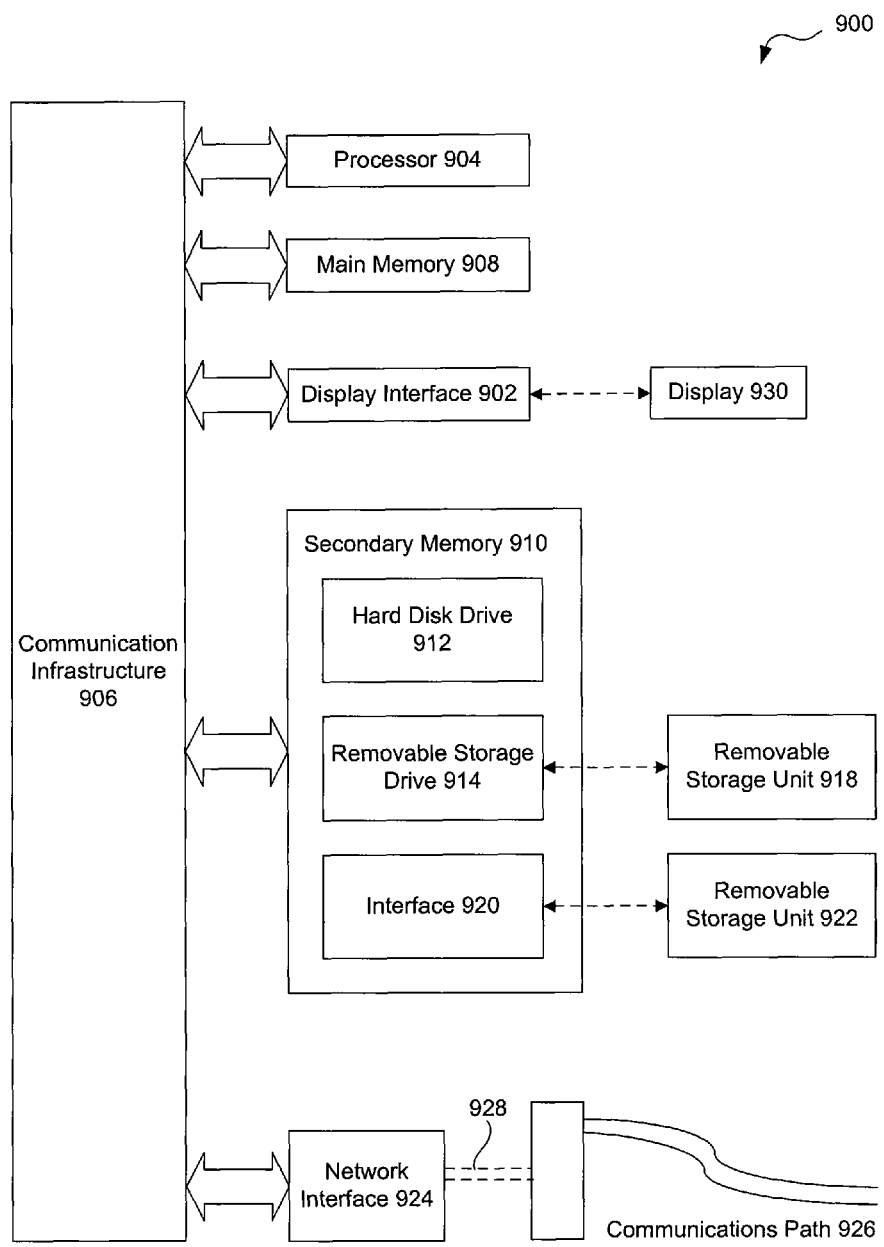
FIG. 9 depicts an example computer system in which embodiments of the present invention may be implemented.

Various aspects of the present invention can be implemented by software, firmware, hardware, or a combination thereof. FIG. 9 illustrates an example computer system 900 in which the present invention, or portions thereof, can be implemented as computer-readable code. For example, the methods illustrated by flowcharts 300 of FIG. 3, 400 of FIG. 4, 600 of FIG. 6, 700 of FIG. 7, and 800 of FIG. 8, can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912, a removable storage drive 914, and/or a memory stick. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Signals carried over communications path 926 can also embody the logic described herein. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by flowcharts 300 of FIG. 3, 400 of FIG. 4, 600 of FIG. 6, 700 of FIG. 7, and 800 of FIG. 8, discussed above. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A server comprising:
a memory configured to store a system configuration database;
a settings exchange object configured to:
push, from a synchronization server, an administrator modification made to the system configuration database to a client device, and wherein the settings exchange object is configured to set one or more parameters of a logging process at the client device,
communicate settings changes originating from the client device to the synchronization server, and
resolve conflicts between the settings changes originating from the client device and the administrator modification;
an auto upgrade object configured to push an upgrade component to the client device;
a trace and diagnostic object configured to receive a request to retrieve a log of the client device and to pull the log from the client device without informing a user of the client device, wherein the log is generated by the logging process on the client device according to the one or more parameters; and
one or more processors configured to process the settings exchange object, the auto upgrade object, and the trace and diagnostic object.

2. The server of claim 1, wherein the settings exchange object is further configured to:
resolve the conflict between the administrator modification and the client modification by producing a resolved modification,
store the resolved modification in the system configuration database, and
send the resolved modification to the client device.

3. The server of claim 1, wherein the administrator modification comprises a logging level.

4. The server of claim 1, wherein the administrator modification comprises a maximum log size.

5. The server of claim 1, wherein the auto upgrade object is further configured to compare a version number for the upgrade component with a corresponding device version for the client device from the system configuration database, receive an updated version number from the client device, and store the updated version number in the system configuration database.

6. The server of claim 1, wherein the auto upgrade object is further configured to test an auto upgrade flag for the client device stored in the system configuration database.

7. The server of claim 1, wherein the administrator modification comprises an update to the logging process.

8. The server of claim 1, wherein the trace and diagnostic object is further configured to communicate with the client device via a client interface in communication with a client engine.

9. The server of claim 1, wherein the settings exchange object is further configured to retrieve the current device settings from the memory and push them to a client engine to be updated according to the changes originating from the client device.

10. A client device comprising:
a memory comprising:
a device settings module,
a settings exchange module configured to:
receive a settings change from a server and to set one or more parameters of a logging process at the client device, communicate settings changes originating at the client device to the server, and resolve conflicts between settings changes originating from the client device and the administrator modification, an auto upgrade module configured to receive and apply an upgrade component, and a trace and diagnostic module configured to:
execute the logging process according to the one or more parameters,
receive a request to retrieve a log generated by the logging process, and
provide the log without informing a user of the client device; and one or more processors configured to process the modules.

11. The client device of claim 10, wherein the settings exchange module is further configured to update the device settings module with the settings change.

12. The client device of claim 11, wherein the settings exchange module is further configured to restart one or more components subsequent to updating the device settings module, the one or more components configured to read and use the updated device settings module upon restart.

13. The client device of claim 10, wherein the auto upgrade module is further configured to update the device settings module with a version number for the upgrade component, and to send the version number to the server for storage at the server.

14. The client device of claim 10, wherein the trace and diagnostic module is further configured to silently receive logging preferences and apply the logging preferences to the logging process.

15. A method comprising:
defining a template comprising one or more template device settings;
applying the template device settings to a system configuration for a client device at a synchronization server; and
pushing the template device settings to the client device at the initiative of the synchronization server after determining that the client device permits auto upgrades, wherein the client device is configured to:
update a local device setting using the template device setting,
restart one or more components subsequent to the updating, and
read and use the updated local device setting in the one or more components subsequent to restarting;
communicate settings changes originating from the client device to the synchronization server;
resolving conflicts between the settings changes originating from the client device and an administrator modification;
setting one or more parameters of a logging process at the client device;
receiving a request to retrieve a log of the client device that is generated by the logging process on the client device; and
pulling the log without informing a user of the client device.

16. A system comprising:
a synchronization server comprising a stored device version, the synchronization server configured to:
push an update component to a client engine, at the initiative of the synchronization server, based on a comparison of the stored device version and a version of the update component and a determination that the client engine permits auto upgrades;
set one or more parameters of a logging process at the client device;
receive a request to retrieve a log of the client engine that is generated by the logging process on the client engine; and
pull the log without informing a user of the client engine; and a device comprising the client engine configured to:
receive the update component,
apply the update component,
update a local device version,
restart the client engine,
send the updated local device version to the synchronization server,
communicate settings changes originating from the client device to the synchronization server, and
resolve conflicts between settings changes originating from the client device and an administrator modification,
wherein the synchronization server is further operable to replace the stored device version with the updated local device version.

17. A computer-readable storage device having computer-executable instructions stored thereon that, if executed by a computing device, cause the computing device to perform a method comprising:
sending logging preferences to a client device, the client device configured to run a logging process based on the logging preferences;
selecting the client device for access at a server;
pulling, in response to a request to retrieve one or more logs of the client device, one or more logs from a client engine on the client device without informing a user of the client device, wherein the log is generated by the logging process on the client device;
storing the one or more logs on the server;
receiving settings changes originating at the client device at the server; and
resolving conflicts between settings changes originating from the client device and an administrator modification.

18. A method comprising:
receiving a settings change from a server, the settings change being made to a system configuration database at the server;
receiving one or more parameters for a logging process;
applying the settings change to a local device setting;
executing the logging process according to the one or more received parameters;
receiving a request to retrieve a log generated by the logging process;
providing the log without informing a user of the local device;
communicating settings changes originating from the local device to the server; and
resolving conflicts between settings changes originating from the client device and an administrator modification.

19. The method of claim 18, further comprising:
receiving an upgrade component;
applying the upgrade component;

storing a version number for the upgrade component in a second local device setting; and providing the second local device setting to the server.

20. A computer-readable storage device having computer-executable instructions stored thereon that, if executed by a computing device, cause the computing device to perform a method comprising:

receiving a settings change from a server, the settings change being made to a system configuration database at the server;

receiving one or more parameters for a logging process;

applying the settings change to a local device setting;

executing the logging process according to the one or more received parameters;

receiving a request to retrieve a log generated by the logging process;

providing the log without informing a user of the local device;

communicating settings changes originating from the local device to the server; and resolving conflicts between settings changes originating from the client device and an administrator modification.

21. A method comprising:

modifying a setting in a system configuration database;

pushing, from a synchronization server, the modified setting to a client device for application at the client device, the client device configured to restart one or more components of the client device after the application;

setting one or more parameters of a logging process at the client device;

pushing an upgrade component to the client device;

receiving a request to retrieve a log of the client device, wherein the log is generated by the logging process on the client device;

pulling the log without informing a user of the client device;

communicating settings changes originating from the client device to the synchronization server; and resolving conflicts between settings changes originating from the client device and an administrator modification.

22. The method of claim 21, further comprising:

providing one or more logging settings to the client device for configuration of the logging process.

* * * * *